(12) United States Patent
Nakagawa et al.

(10) Patent No.: US 7,775,925 B2
(45) Date of Patent: Aug. 17, 2010

(54) OIL-FREE CHAIN

(75) Inventors: Takashi Nakagawa, Osaka (JP); Hiroki Ishida, Osaka (JP); Toshihiko Aoki, Osaka (JP); Hirofumi Miki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 73 days.

(21) Appl. No.: 11/978,404

(22) Filed: Oct. 29, 2007

(65) Prior Publication Data
US 2008/0161147 A1  Jul. 3, 2008

(30) Foreign Application Priority Data
Dec. 27, 2006  (JP) .............................. 2006-353488

(51) Int. Cl.
*F16G 13/02* (2006.01)

(52) U.S. Cl. ........................... 474/231; 474/91; 474/207

(58) Field of Classification Search .................. 474/207, 474/91, 231, 212, 215; 59/4, 5
See application file for complete search history.

(56) References Cited

U.S. PATENT DOCUMENTS

| | | | | |
|---|---|---|---|---|
| 2,906,562 | A | * | 9/1959 | Burgman ..................... 305/104 |
| 3,336,089 | A | | 8/1967 | Krickler |
| 3,781,066 | A | * | 12/1973 | Deli et al. ................... 305/104 |
| 6,393,818 | B1 | * | 5/2002 | Nakagawa et al. ............... 59/4 |
| 2007/0129194 | A1 | | 6/2007 | Wu |

FOREIGN PATENT DOCUMENTS

| | | |
|---|---|---|
| EP | 0 601 469 A1 | 6/1994 |
| JP | 53-44848 | 4/1978 |
| JP | 55-82210 | 6/1980 |
| JP | 57-181952 | 11/1982 |
| JP | 59-127950 | 8/1984 |
| JP | 63-125842 | 5/1988 |
| JP | 64-030946 | 2/1989 |
| JP | H09-296798 A | 11/1997 |
| JP | 2001-071044 A | 3/2001 |
| JP | 2001-137961 A | 5/2001 |
| JP | 2001-304345 A | 10/2001 |
| JP | 2003-194227 A | 7/2003 |
| JP | 2004-190829 A | * 7/2004 |
| JP | 2004-256262 | 9/2004 |
| TW | M290538 | 5/2006 |

OTHER PUBLICATIONS

U.S. Appl. No. 11/879,681, Tsubakimoto Chain Co.
U.S. Appl. No. 11/903,077, Tsubakimoto Chain Co.

* cited by examiner

*Primary Examiner*—Robert A Siconolfi
*Assistant Examiner*—Vu Q Nguyen
(74) *Attorney, Agent, or Firm*—Howson & Howson LLP

(57) ABSTRACT

An oil-free chain has bushings which protrude from the outer surfaces of the inner link plates into which they are press-fit, and extend into bushing supporting bores formed in the inner surfaces of the outer link plates of the chain. These bushing supporting bores are formed by a pressing operation which produces offsets in portions of the outer plate, so that, as the bushing supporting bores are formed in the inner surfaces of the outer plates, bosses are simultaneously formed on the outer surfaces. The connecting pins of the chain are press-fit into pin holes in these bosses. The bushing supporting bores are formed without removal of material by machining, and therefore the strength of the outer plates is not compromised.

4 Claims, 8 Drawing Sheets

OIL-FREE CHAIN

CROSS-REFERENCE TO RELATED APPLICATION

This application claims priority from Japanese patent application 2006-353488, filed Dec. 27, 2006. The disclosure of Japanese patent application 2006-353488 is incorporated by reference.

FIELD OF THE INVENTION

The invention relates to an "oil-free" chain, for use as a power transmitting roller chain, a transfer conveyor chain, or the like. The invention relates more specifically to an oil-free roller chain or rollerless bushing chain, comprising pairs of inner plates and pairs of outer plates in alternating, overlapping relationship along the length of the chain. In such a chain, a pair of bushings for each pair of inner plates are press-fit into bushing holes in the inner plates, and a pair of pins for each pair of outer plates are press-fit in to pin holes in the outer plates. Each pin has an outer surface, and extends through, and fits loosely in, one of the bushings. The term "oil free" does not imply the complete absence of lubricant, but rather the presence of a permanent internal lubricant. In an oil-free chain, lubricating oil is sealed between the inner circumferential surface of each bushing and the outer circumferential surface of the connecting pin that extends through the bushing.

BACKGROUND OF THE INVENTION

Japanese Laid-Open Patent Publication No. 2004-256262 describes a known seal chain in which lubricating oil is sealed between the inner circumferential surface of a bushing and the outer circumferential surface of a connecting pin. The seal in such a chain comprises a ring that contacts at least an end surface of the bushing, and an elastic seal in pressing contact with the ring and an outer link plate facing the ring.

In the above-described conventional seal chain, in order to seal the lubricating oil between a pin and a bushing effectively, the ring member and elastic seal are pressed between the bushing and the outer link plate. The pressing force creates resistance to relative bending between the outer link plates and the inner link plates, and the result is an increased overall resistance of the chain to bending.

The bending resistance in the conventional chain can be reduced by surface finishing to decrease the roughness of the inner surfaces of an outer link plates and the end surfaces of the bushings. Surface finishing is also desirable in order to reduce wear of the ring and the elastic seal. However, need for surface finishing increases the cost of production of the chain.

Since the ring and the elastic seal are additional parts, the overall number of parts in the chain is increased, and assembly of the chain is made more difficult. The need for these additional parts also increases the cost of production.

Accordingly, an object of the invention is to solve the above-mentioned problems. The invention addresses these problems by providing an oil-free chain which achieves several objectives. First, it prevents leakage of lubricating oil and the invasion of external dust during the operation of the chain. Second, it suppresses wear between the outer circumferential surfaces of the connecting pins and the inner circumferential surfaces of the bushings so that wear elongation of the chain is prevented for a long period of time. Third, the number of chain parts is small in comparison with the number of parts in the above-described conventional seal chain, and the cost of production and difficulty of assembly and disassembly of the chain are reduced. The invention accomplishes these objectives while maintaining the strength of the link plates of the chain.

SUMMARY OF THE INVENTION

The oil-free chain according to the invention comprises pairs of inner plates and pairs of outer plates in alternating, overlapping relationship along the length of the chain. A portion of the outer surface of each inner plate is in overlapping relationship with a portion of the inner surface of an outer plate. A pair of bushings is provided for each pair of inner plates. The bushings have inner circumferential surfaces and end portions, and are press-fit into bushing holes in the inner plates. A pair of connecting pins is provided for each pair of outer plates. Each connecting pin is press-fit into pinholes in the outer plates and extends through, and fits loosely in, one of the bushings. Lubricating oil is sealed between the inner circumferential surfaces of each bushing and the outer circumferential surface of the connecting pin extending through the bushing. An end portion of each bushing protrudes from the outer surface of the inner plate in which it is press-fit, and extends into a bushing-supporting bore formed in the inner surface of the overlapping outer plate. Each bushing-supporting bore formed in the inner surface of an outer plate is coaxial with one of the pin holes, and the pinhole extends though an outwardly bulging boss formed on the outer surface of the same outer plate on the side opposite the side in which the bushing-supporting bore is formed. The bushing-supporting bore and the outwardly bulging boss are formed as an offset, or stepped, structure in an outer plate that would otherwise have parallel, flat, inner and outer surfaces.

Each bushing-supporting bore in the inner surface of an outer plate, and its opposite, outwardly bulging, boss, are preferably formed by pressing a flat outer plate to cause a portion thereof to be offset, thereby forming the bore and the outwardly bulging boss.

An oil retaining groove is preferably formed on the outer circumferential surface of each connecting pin.

In the preferred embodiments, closely facing rough surfaces formed on overlapping portions of the outer surfaces of the inner plates and the inner surfaces of the outer plates form an oil-retaining labyrinth that resists leakage of oil from the space between the outer circumferential surfaces of the pins and the inner circumferential surfaces of the bushings.

The inner diameter $W_j$ of each bushing supporting bore, the diameter $W_{bi}$ of the inner circumferential surface of each bushing, the outer diameter $W_{bo}$ of each bushing, and the outer diameter $W_p$ of each connecting pin, should satisfy the relationship $W_j - W_{bo} > W_{bi} - W_p$.

The depth $D_j$ of each bushing supporting bore, and the extent $D_b$ by which each bushing protrudes from the outer surface of the inner plates in which it is press-fit, should satisfy the relationship $D_j < D_b$. In addition, the depth $D_j$, the extent $D_b$ by which each bushing protrudes from the outer surface of the inner plates, the distance $D_o$ between inner surfaces of the outer plates of each pair of outer plates, and the distance $D_i$ between the outer surfaces of the inner plates of each pair of inner plates, should satisfy the relationship $D_j + D_o < D_i + 2D_b < 2D_j + D_o$.

Because lubricating oil is sealed between the inner circumferential surfaces of the bushings and the outer circumferential surfaces of the connecting pins, it is possible operate the chain as a drive chain for a long time without external lubrication.

The labyrinth structure suppresses leakage of lubricating oil caused by inertial forces and the like generated as the chain travels in a circulating path, and, at the same time suppresses the invasion of dust into interiors of the bushings, thereby preventing the dust from causing wear elongation of the chain.

Since no seal is pressed between the overlapping portions of the inner and outer plates of the chain as in a conventional seal chain, the chain can flex smoothly during its travel in a circulating path. In addition, the number of chain parts is small in comparison to the number of parts in a conventional seal chain. Moreover, surface finishing is unnecessary in order to achieve smooth flexing and to prevent wear of a sealing member. Therefore, production of the chain, and assembly and disassembly of the chain, are much easier and less expensive.

A distinguishing feature of the invention is that each bushing-supporting bore formed in the inner surface of an outer plate is coaxial with one of the pin holes, and said one of the pin holes extends though an outwardly bulging boss formed on the outer surface of the same outer plate opposite the bushing-supporting bore. The relationship between the outwardly bulging boss and the bushing-supporting bore is such that the strength of the bulging section of the outer plate is substantially the same as the strength of remainder of the plate. Thus, the formation of the bushing supporting bores does not result in a reduction in the strength of the outer plates.

Since the bushing shaft supporting bore is preferably formed by a pressing operation that produces an offset in the outer plate, the boss and the bushing support bore are formed simultaneously. No machining operation such as drilling, cutting, milling, or the like, are required to form the bushing support bore, and production of the chain is simplified.

When oil retaining grooves are formed in the connecting pins, more lubricating oil can be sealed in the spaces between the pins and the bushings. Consequently, sliding wear between the outer circumferential surface of the connecting pins and the inner circumferential surfaces of the bushings can be significantly reduced, and, as a result, the rate of wear elongation of the chain can be significantly reduced.

By utilizing closely facing rough surfaces of the inner and outer plates to form a labyrinth structure, an improved sealing effect can be achieved so that lubricating oil can be prevented from leaking out, and, at the same time, invasion of dust from the outside can be prevented.

When the relationship $Wj-Wbo>Wbi-Wp$ is satisfied, even when a tensile force applied to the chain is such that the inner circumferential surface of a bushing and an outer circumferential surface of a connecting pin come into contact with each other, mutual contact between the outer circumferential surface of the protruding end of the bushing and the inner circumferential surface of a bushing supporting bore is prevented. As a result, there is no production of abrasive metal powder from wear due to sliding contact between the outer circumferential surfaces of the protruding ends of the bushings and the inner circumferential surfaces of the bushing supporting bores, and wear elongation of the chain due to the effects of such abrasive metal powder is prevented.

Where the depth $Dj$ of the bushing supporting bore portion and the protrusion $Db$ of the bushing beyond the outer surface of the inner plate satisfy the relationship $Dj<Db$, even if the inner link becomes skewed, pivoted or biased with respect to the outer link during operation of the chain, the end surface of the bushing and the bottom surface of a bushing shaft support portion, which have small areas, come into contact with each other, and contact between the outer surface of the inner plate and the inner surface of the outer plate, which have comparatively large areas, is reliably prevented. Thus, smooth bend sliding of the chain for a long period of time can be realized.

Furthermore, when the relationship $Dj+Do<Di+2Db<2Dj+Do$ is satisfied, even if an inner link becomes skewed, pivoted, or biased with respect to an outer link in a widthwise direction during operation of the chain, the end portion of the bushing does not separate from the bushing supporting bore. Therefore, leakage of lubricating oil and invasion of external dust can be reliably prevented during operation of the chain, sliding wear between the outer circumferential surface of the connecting pin and the inner circumferential surface of the bushing can be reduced over a long period of time. This feature also contributes to the prevention of wear elongation of the chain.

DETAILED DESCRIPTION OF THE PREFERRED EMBODIMENTS

In the oil-free chain according to the invention, both ends of each bushing protrude beyond the inner plates of the chain, and are received in bushing-supporting bores formed in the outer plates on the inner sides thereof while bosses, into which the connecting pins are press-fit, are formed on the outer sides of the outer plates opposite the bushing-supporting bores. Because the bushings are received in the bushing-supporting bores, leakage of lubricating oil and invasion of external dust are reduced, wear between the outer circumferential surfaces of the connecting pins and the inner circumferential surfaces of the bushings is suppressed. As a result, the rate of wear elongation of the chain is reduced. Moreover, the number of parts of the chain is minimized, and production of the chain is significantly simplified. The invention is applicable to roller chains and also to rollerless bushing chains. However, the invention is preferably embodied in a roller chain since it is less subject to wear because of smoother engagement between the chain and its sprockets.

The oil retaining grooves in the connecting pins can take any of various shapes. For example, the groove can be formed by cutting the connecting pin so that the groove has a D-shaped cross-section. Alternatively, an circumferential annular groove can be provided. However, the D-shaped groove is preferred because of its oil retaining capacity. Furthermore, two oil-retaining grooves may be provided on the outer circumferential surface of the connecting pin in order to increase the amount of oil retained in the chain.

Figure 1:
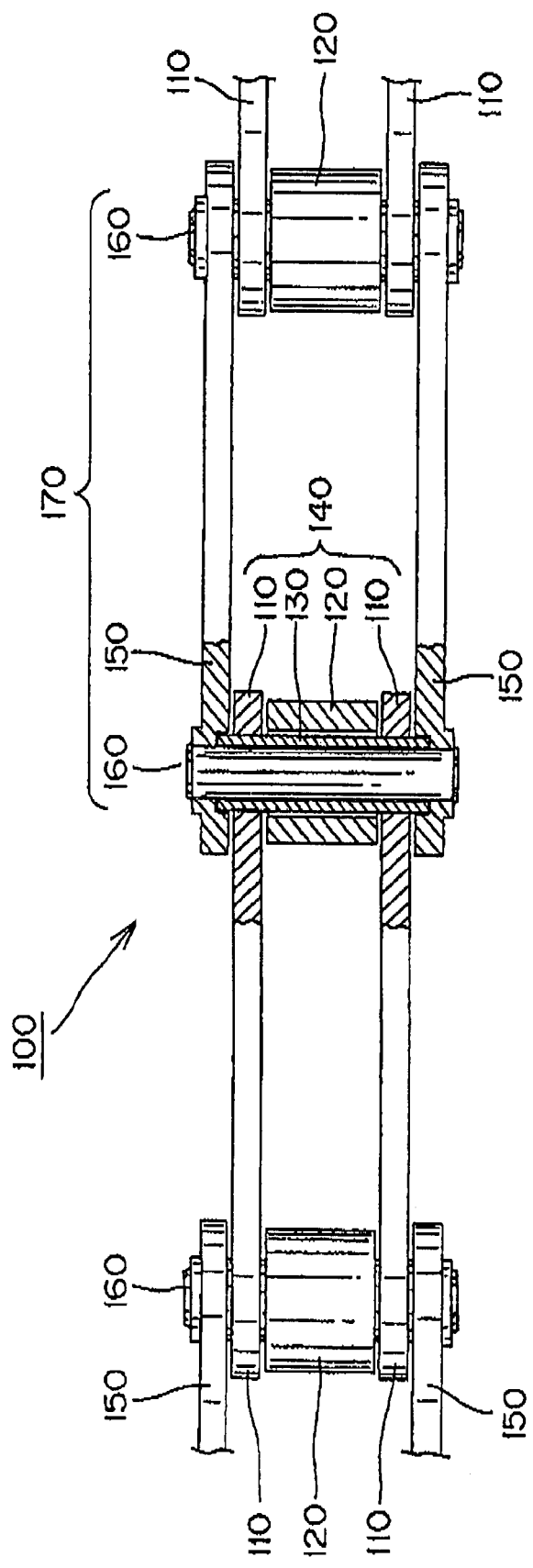
FIG. 1 is a schematic view, partly in cross-section, of a part of the oil-free chain in accordance with a first embodiment of the invention.
Figure 3:
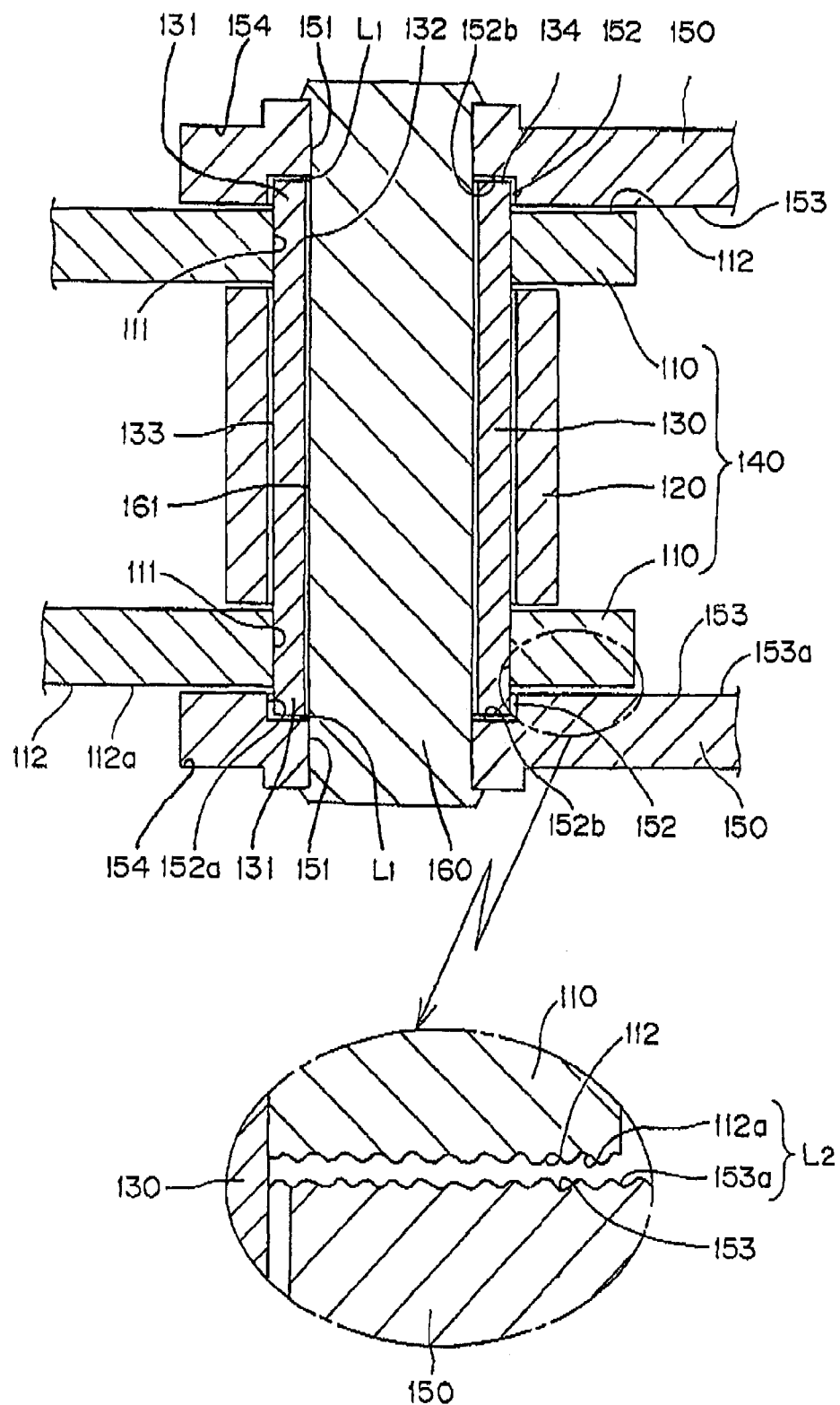
FIG. 3 is an enlarged cross-sectional view of a part of the oil-free chain shown in FIG. 1, including an enlarged auxiliary view showing details of overlapping, mutually facing, surfaces of the inner and outer plates of the chain.

As shown in FIGS. 1 and 3, a wear resistant and heat resistant, oil-free conveyor chain 100 according to a first embodiment of the invention, includes an inner link 140 and outer links 170. In the inner link 140, the ends of a pair of bushings 130, on which rollers 120 fit loosely, are press-fit into holes 111 in a pair of spaced inner plates 110. In the outer links 170, both ends of a pair of connecting pins 160 are press-fit into holes 151 of a pair of spaced outer plates 150.

The inner and outer links 140 and 170 are connected by virtue of the fact that each connecting pin 160 loosely fits into a bushing 130. Lubricating oil is sealed between the bushing 130 and the connecting pin 160.

Figure 2:
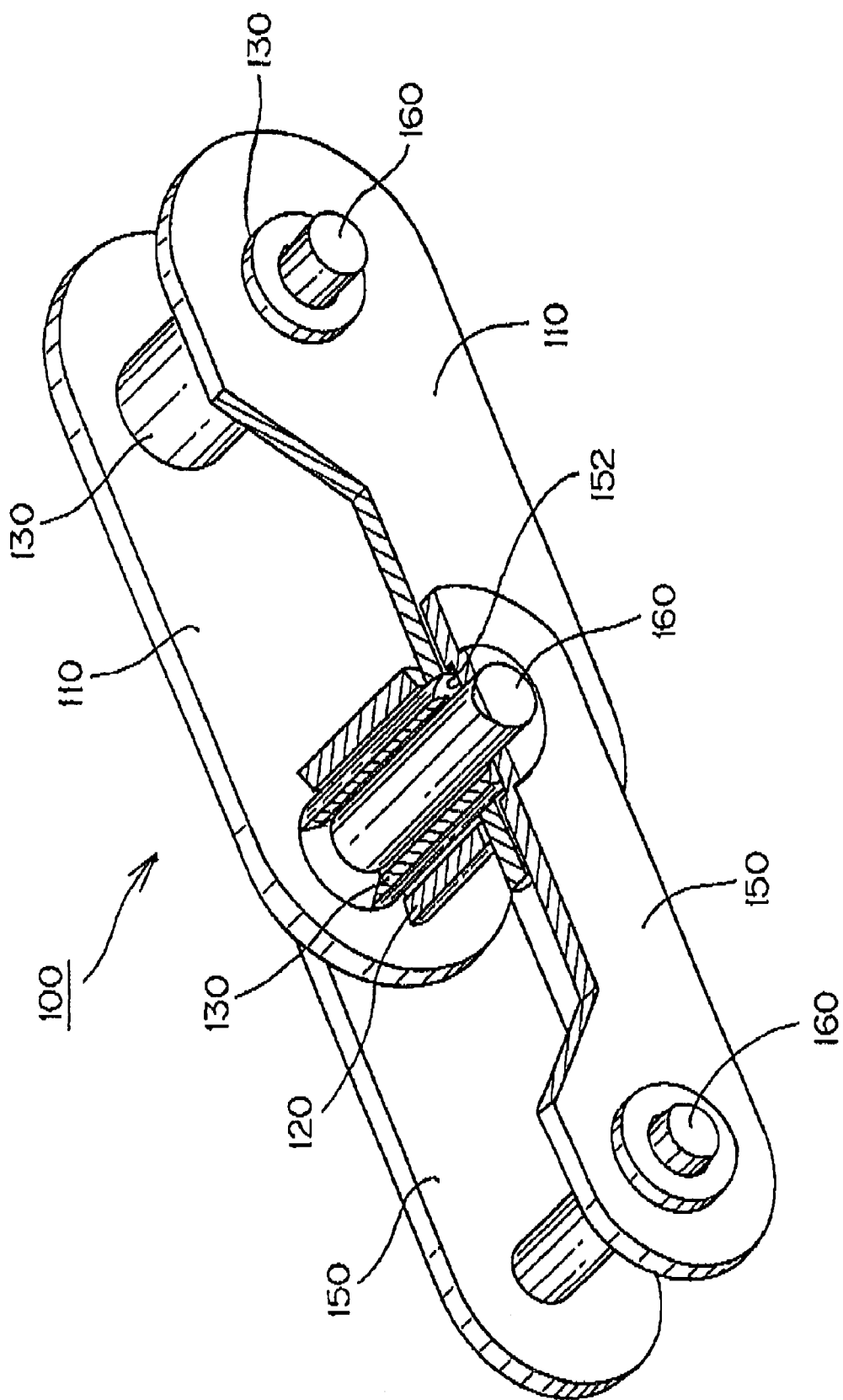
FIG. 2 is a perspective view, partly in cross-section, illustrating the manner in which an inner link and an outer link of the chain are connected.

As shown in FIGS. 2 and 3, bushing supporting bores 152 are formed on the inner sides 153 of the outer plates 150. These bushing supporting bores are open to their full diameter at the inside-facing surfaces of the outer plates. The bushing-supporting bores are formed by pressing the outer plates, thereby causing the bores to be formed in the inner sides of the plates while simultaneously causing bosses to be formed on the outer sides of the plates opposite the bores. Thus, the bores and bosses are formed as offset portions of the outer plate. A pin-receiving hole 151, coaxial with a bushing support bore, is formed in the boss of the outer plate opposite the bore. The ends of each bushing 130 protrude from the outer sides 112 of the inner plates 110, and are received in, and supported by, the bushing supporting bores 152.

As shown in FIGS. 2 and 3, end portions 131 of the bushings 130 protrude from outer sides 112 of the inner plates 110, and are respectively supported in the bushing shaft supporting bores 152.

As shown in the auxiliary enlargement which is part of FIG. 3, the overlapping parts of the inner surface 153 of the outer plate 150, and the outer surface 112 of the inner plate 110, have a matte-finish forming rough surfaces 153$a$ and 112$a$ respectively, which cooperate to form a labyrinth structure L2.

Figure 4:
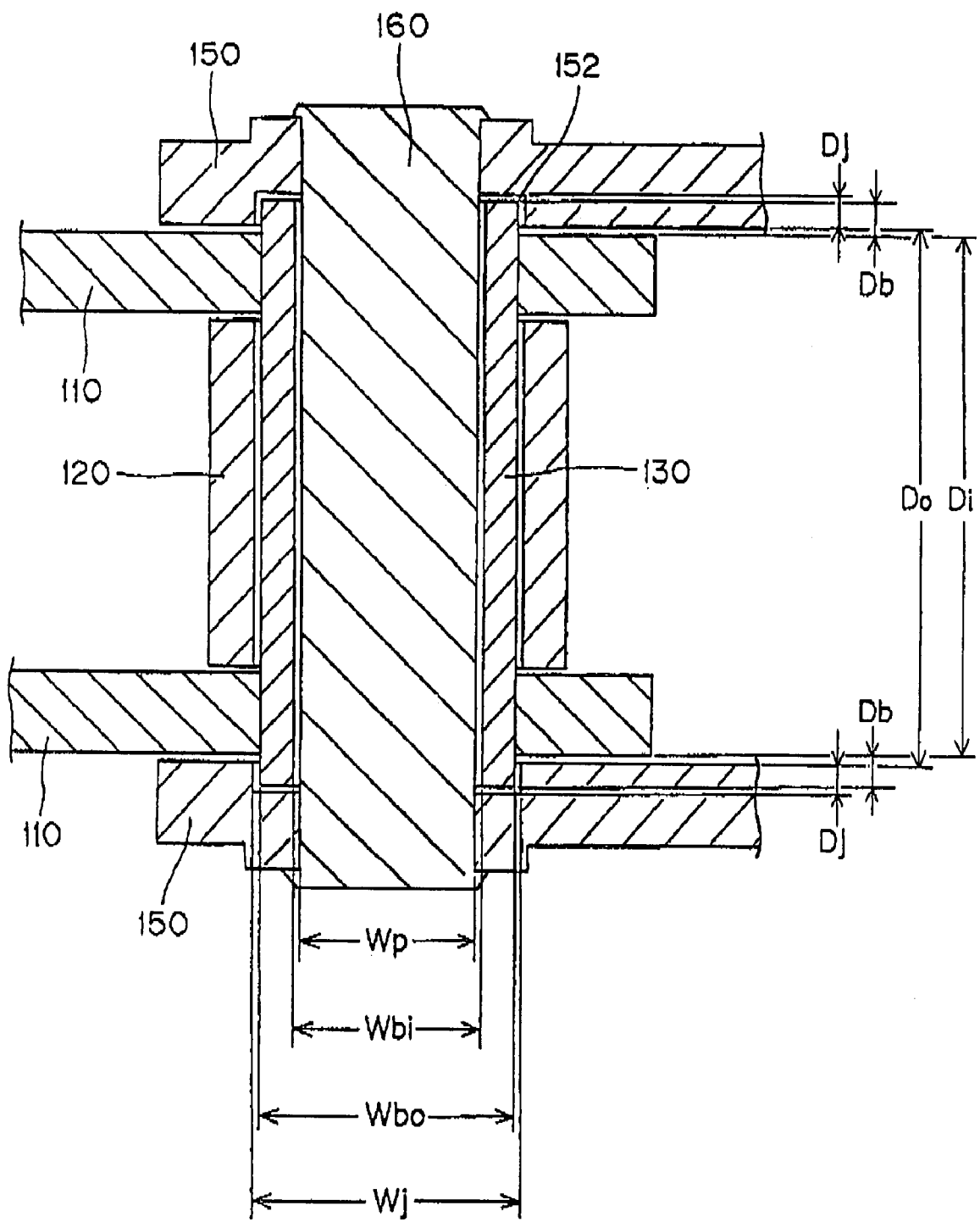
FIG. 4 is a cross-sectional view of the chain of the first embodiment, showing dimensions of parts of the chain.

As shown in FIG. 4, the inner diameter Wj of the bushing supporting bore 152, the inner diameter Wbi of the bushing 130, the outer diameter Wbo of the bushing, and the outer diameter Wp of the connecting pin 160, are formed so that they satisfy the relationship Wj−Wbo>Wbi−Wp.

FIG. 4 also shows that the bushing 130 protrudes from the outer surface of inner plate 110 by an amount Db, which exceeds the depth Dj of the bushing support bore 152. That is, Dj<Db.

The depth Dj of the bushing supporting bore 152, the amount Db of protrusion of the bushing 130 from the outer surface of the inner plate 110, the spacing Do between the inside faces of the plates of the outer link 170, and the spacing Di of the outside faces of the plates of the inner link 140, are formed so that they satisfy the relationship Dj+Do<Di+2Db<2Dj+Do.

As shown in FIG. 3, in the chain 100, since the protruding ends of each bushing 130 extend into the bushing supporting bores 152 in the inner sides 153 of the outer plates 150, a labyrinth structure L1 is formed between an end portion of each bushing 130 and the inner surface of a bushing supporting bore 152. This labyrinth structure prevents leakage of lubricating oil due to inertial forces generated during circulating travel of the chain. The sealed lubricating oil, guided by an inner circumferential surface of the bushing 130 tends to ooze outward toward the outer plates 150. However, the bent lubricant leakage path resulting from the cooperative relationship between the protruding ends of the bushings and the bushing supporting bores resists leakage of oil to the outside. At the same time, the labyrinth structure prevents the invasion of dust from the outside.

The chain 100 does not require additional seal members compressed between the inner plates 110 and the outer plates 150. Therefore, the chain can flex more smoothly than a conventional seal chain, and has the additional advantage that it has smaller number of the parts so that assembly of the chain is less expensive, and connection and disconnection of the chain are made easier.

Moreover, surface finishing to reduce the roughness of the plates in order to prevent wear of seal members is not needed. The avoidance of surface finishing also contributes to the low production cost of the chain.

The bushing supporting bore 152 is formed by a pressing operation in which a portion of the outer plate is offset so that, as the bore is formed on the inner surface, the outer surface is bulged to form a boss on the outer surface. The thickness of the bulged section of the outer plate is the same as the thickness of the remainder of the plate. Consequently, the modulus of the bulged section and the modulus of other parts of the plate remain substantially the same, and the formation of the bushing support bore does not result in a reduction in the strength of the plate.

Furthermore, the bushing supporting bore, and the boss in which the connection pin is press-fit, are formed simultaneously in a single press-punching operation. No machining step such as drilling, cutting, or milling is needed to produce the bushing supporting bore 152, and the production of the chain is accordingly simplified.

The labyrinth structure L2, formed by the closely facing rough surfaces 153$a$ and 112$a$, shown in FIG. 3, further improves the sealing effect of the chain, both preventing lubricating oil from leaking out, and preventing invasion of dust from outside the chain.

Figure 5:
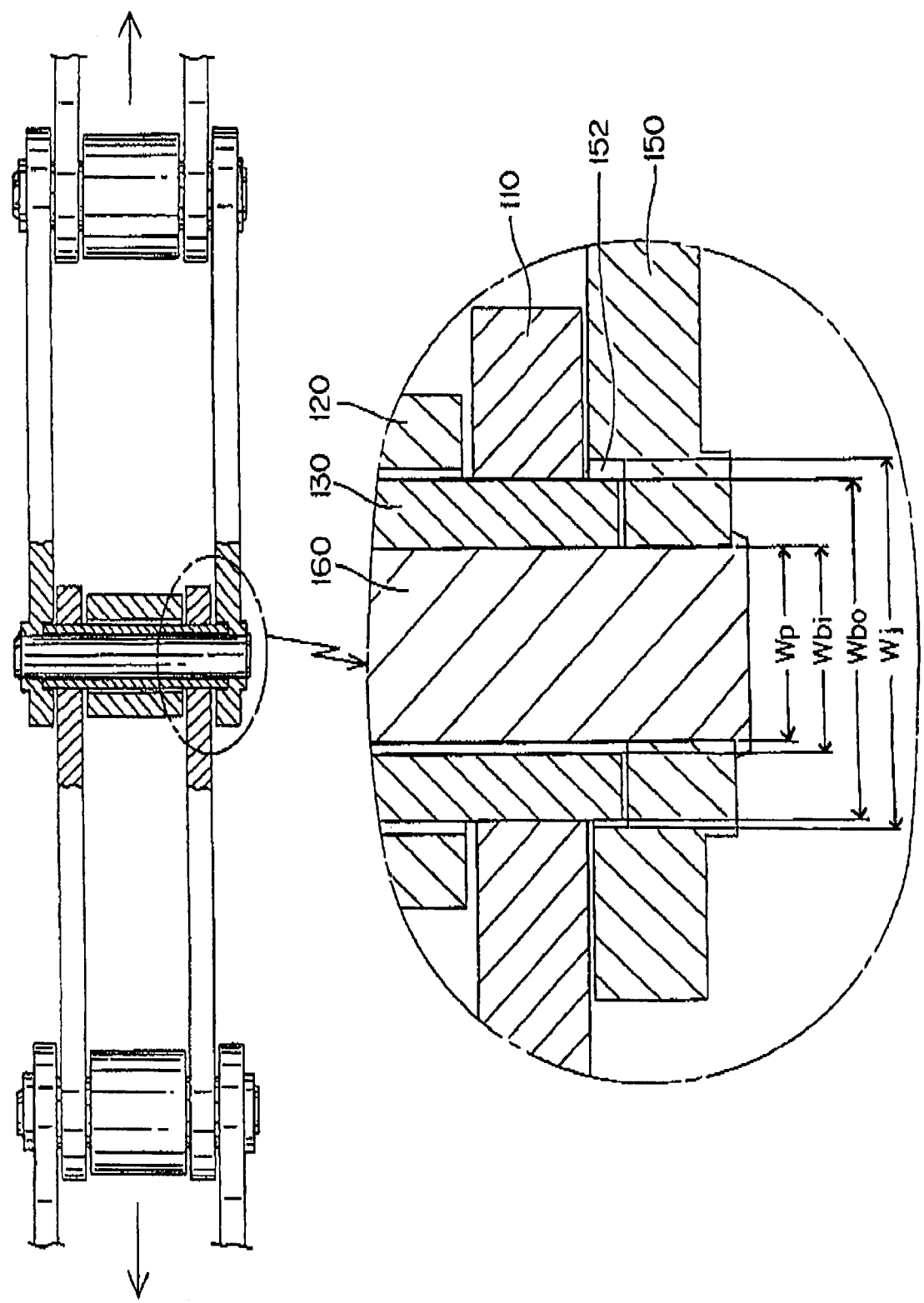
FIG. 5 is a plan view of the chain, partly in section, showing the chain in tension, and including an enlarge auxiliary view illustrating details of a part of the connection between the inner and outer links of the chain.

When the relationship Wj−Wbo>Wbi−Wp is satisfied, as shown the auxiliary enlargement of a portion of FIG. 5, even if a high degree of tension in the chain biases an inner link with respect to an outer link, the inner circumferential surface 132 (FIG. 3) of the bushing 131 and the outer circumferential surface 161 of the connecting pin 160 (FIG. 3) come into contact with each other before the outer circumferential surface of the end of a bushing can contact the inner circumferential surface 152$a$ (FIG. 3) of a bushing supporting bore 152. Contact between the outer circumferential surface of an end portion of a bushing and the inner circumferential surface of a bushing supporting bore is entirely prevented. As a result, even if the supply of lubricating oil is inadequate, generation of metal powder by wear due to sliding contact between the outer circumferential surface of end portion of a bushing and the inner circumferential surface of a bushing supporting bore is avoided, and metal powder does not invade the space between the connecting pin and the bushing to cause abrasion, abnormal wear, and undesirable wear elongation of the chain.

Figure 6:
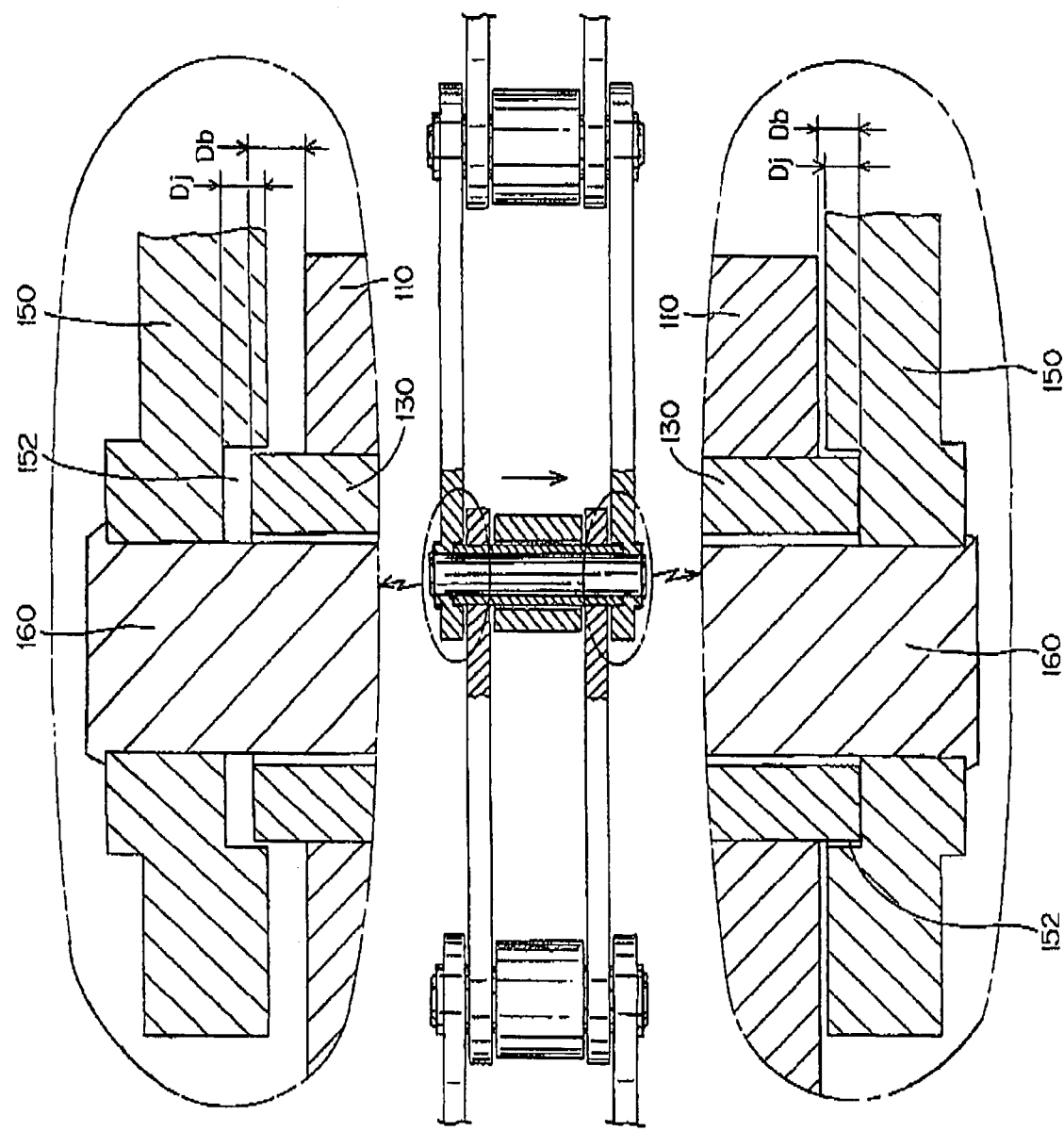
FIG. 6 is a plan view of the chain, partly in section, including two enlarged auxiliary views, showing an inner link biased in a widthwise direction.

Referring to FIGS. 3, 4 and 6, if the relationship Dj<Db is satisfied, even if an inner link 140 becomes skewed, pivoted or biased with respect to an outer link 170, an end surface 133 (FIG. 3) of the bushing and a bottom surface 152$b$ (FIG. 3) of a bushing supporting bore 152 come into contact with each other. The end of the bushing and the bottom of the bore 152 have relatively small sliding areas compared to the areas of the mutually facing surfaces of the inner and outer plates. Because the ends of the bushings come into contact with the bottoms of the bores 152 before the inner and outer plates can come together, sliding contact between the mutually facing surfaces of the inner and outer plates is prevented as shown in FIG. 6. Thus, smooth bending of the chain over a long period of time can be realized.

Again referring to FIGS. 3, 4 and 6, when the relationship Dj+Do<Di+2Db<2Dj+Do is satisfied, even if an inner link 140 becomes skewed, pivoted or biased in a widthwise direction with respect to an outer link 170, the protruding end of the bushing 130 cannot separate from the bushing supporting bore 152. Therefore, leakage of lubricating oil and invasion of external dust can be prevented more reliably during operation of the chain, and wear between the outer circumferential surface 161 of the connecting pin 160 and the inner circumferential surface 131 of the bushing 130 can be reduced over a long period of time so that wear elongation of the chain can be prevented.

Figure 7:
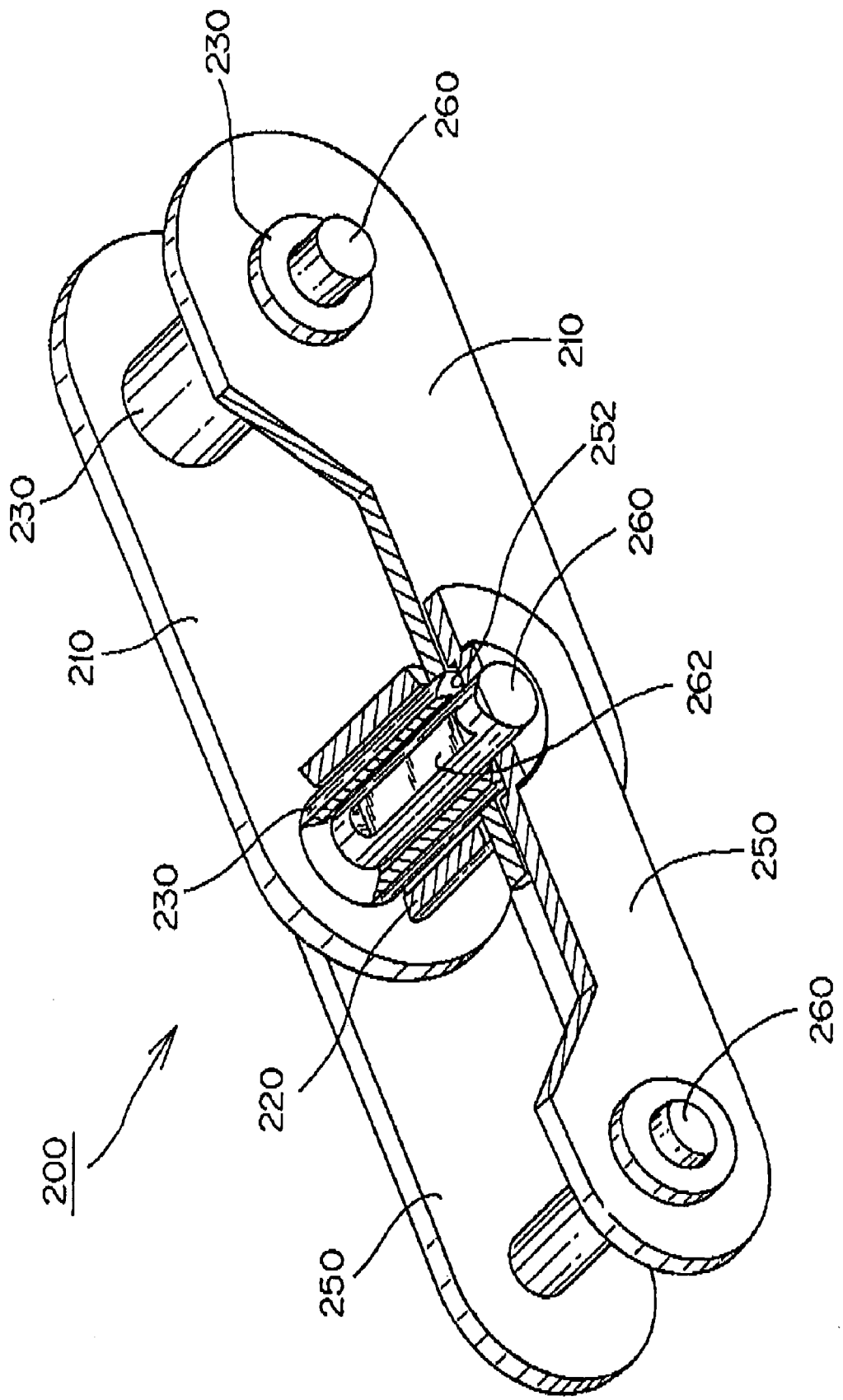
FIG. 7 is a perspective view, partly in section, showing a portion of a chain according to a second embodiment of the invention.
Figure 8:
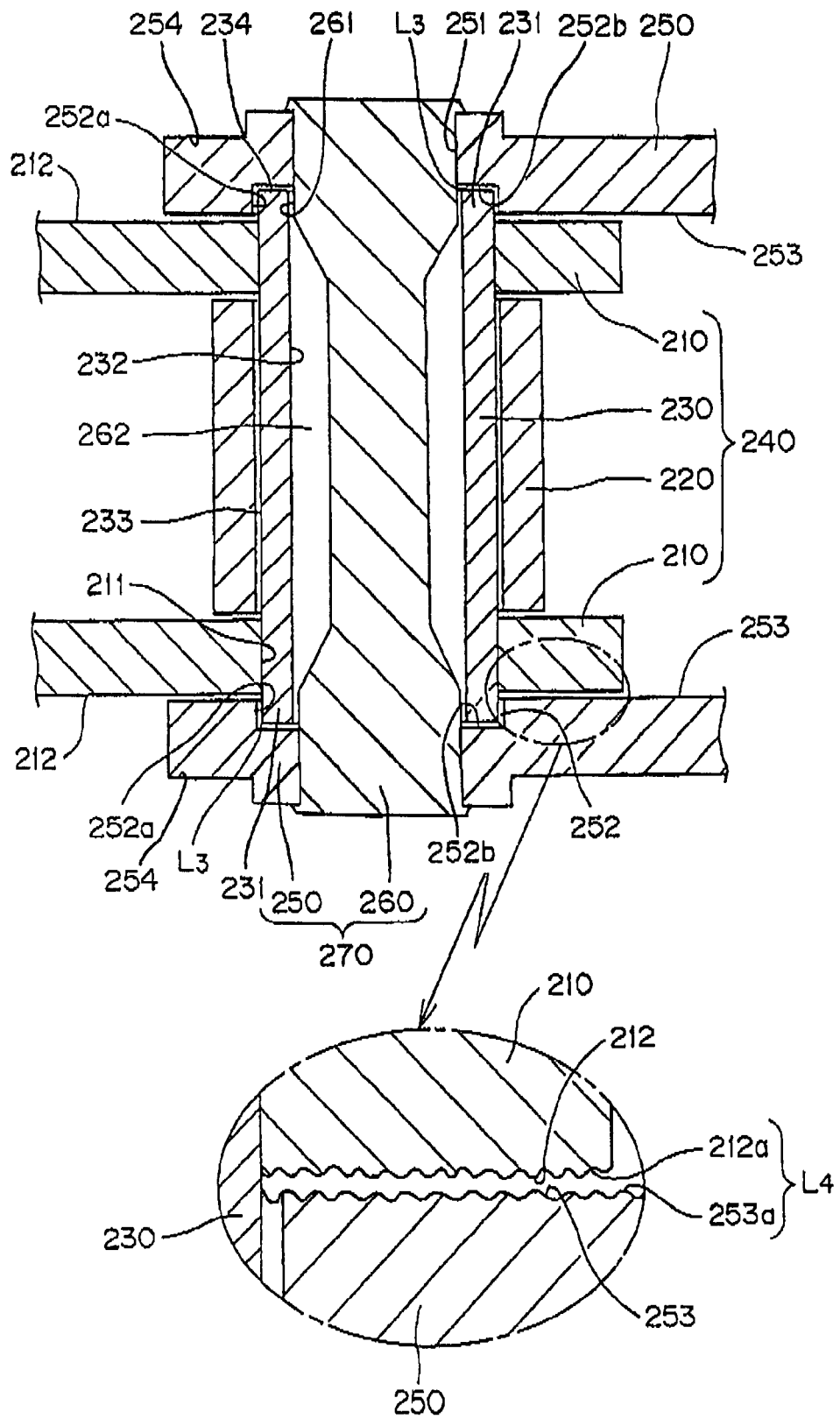
FIG. 8 is a cross-sectional view of a part of the chain of FIG. 7, including an enlarge auxiliary view showing details of overlapping, mutually facing, surfaces of the inner and outer plates of the chain.

In the second embodiment of the invention, shown in FIGS. 7 and 8, a wear-resistant and heat-resistant oil-free chain 200 includes an inner link 240 and an outer link 270. In the inner link 240, rollers 220 fit loosely on bushings 230. The ends of each bushing 230 are press-fit into holes 211 of a pair of inner plates 210. In the outer link 270, both ends of a pair of connecting pins 260 are press-fit into holes 251 of a pair of outer plates 250.

The inner links 240 and the outer links 270 are connected by virtue of the fact that each connecting pin 260 extends through a bushing 230. Lubricating oil is sealed between each bushing 230 and the connecting pin 260 extending through the bushing.

As shown in FIGS. 7 and 8, the inner surface 253 of an outer plate 250 is provided with a bushing support bore 252 by pressing the outer plate 250, causing a portion thereof to be offset so that, as the bore is formed in the inner side of the plate, a boss is simultaneously formed on the outer side. As a result of the pressing operation, the outer plate assumes a stepped configuration as seen in FIG. 8.

Furthermore, as shown in FIGS. 7 and 8, both ends of each bushing 130 protrude from outer sides 212 of the inner plates 210, and are respectively supported by the bushing supporting bores 252.

As shown in the auxiliary enlargement which is part of FIG. 8, the overlapping parts of the inner surface 253 of the outer plate 250, and the outer surface 212 of the inner plate 210, both have a matte-finish, forming rough surfaces 253a and 212a respectively, which cooperate to form a labyrinth structure L4. As shown in the main part of FIG. 8, two D-shaped oil retaining grooves 262 are provided on opposite sides of the outer circumferential surface of the connecting pin 260.

As in the first embodiment, the inner diameter Wj of the bushing supporting bore 252, the inner diameter Wbi of the bushing 230, the outer diameter Wbo of the bushing 230, and the outer diameter Wp of the connecting pin 260 satisfy the relationship Wj−Wbo>Wbi−Wp. Moreover, as in the first embodiment, the bushing 230 protrudes from the outer surface 212 of inner plate 210 by an amount Db, which exceeds the depth Dj of the bushing support bore 252. That is, Dj<Db.

As in the first embodiment, the depth Dj of the bushing supporting bore 252, the amount Db of protrusion of the bushing 230 from the outer surface of the inner plate 210, the spacing Do between the inside faces of the plates of the outer link 270, and the spacing Di of the outside faces of the plates of the inner link 240, are formed so that they satisfy the relationship Dj+Do<Di+2Db<2Dj+Do.

As shown in FIG. 8, in the chain according to the second embodiment of the invention, since the protruding ends of each bushings 230 extend into the bushing supporting bores 252 in the inner sides 253 of the outer plates 250, a labyrinth structure L3 is formed between an end portion of each bushing 230 and the inner surface of a bushing supporting bore 252. This labyrinth structure prevents leakage of lubricating oil due to inertial forces generated during circulating travel of the chain. The sealed lubricating oil, guided by an inner circumferential surface of the bushing 230 tends to ooze outward toward the outer plates 250. However, the bent lubricant leakage path resulting from the cooperative relationship between the protruding ends of the bushings and the bushing supporting bores prevents leakage of oil to the outside. At the same time, the labyrinth structure prevents the invasion of dust from the outside.

The chain 200 does not require additional seal members compressed between the inner plates 210 and the outer plates 250. Therefore, the chain can flex more smoothly than a conventional seal chain, and has the additional advantage that it has a smaller number of the parts. Moreover, surface finishing to reduced the roughness of the plates in order to prevent wear of seal members is not needed. The avoidance of additional sealing members and the avoidance of surface finishing contribute to the low production cost of the chain.

As in the first embodiment, the thickness of the bulged section of the outer plate is the same as the thickness of the remainder of the plate. Consequently, the modulus of the bulged section and the modulus of other parts of the plate remain substantially the same, and the formation of the bushing support bore does not result in a reduction in the strength of the plate. Furthermore, the bushing supporting bore 252, and the boss in which the connection pin is press-fit, are formed simultaneously in a single press-punching operation. No machining step such as drilling, cutting, or milling is needed to produce the bushing supporting bore 252, and the production of the chain is accordingly simplified.

The two oil retaining grooves 262, which hold lubricating oil between the inner circumferential surface 232 of the bushing 230 and the outer surface of the connecting pin, hold a large quantity of lubricating oil. The additional lubricating oil capacity afforded by the grooves 262 ensures that sliding wear between the outer circumferential surface 261 of the connecting pin 260 and the inner circumferential surface 231 of the bushing 230 can be reduced over a long period of time so that wear elongation of the chain can be prevented.

The labyrinth structure L4, formed by the closely facing rough surfaces 253a and 212a, shown in the auxiliary enlargement of part of FIG. 8, further improve the sealing effect of the chain, both preventing lubricating oil from leaking out, and preventing invasion of dust from the outside.

As in the case of the first embodiment, since the relationship Wj−Wbo>Wbi−Wp is satisfied, contact between the outer circumferential surface of an end portion of a bushing and the inner circumferential surface of a bushing supporting bore is entirely prevented. As a result, even if the supply of lubricating oil is inadequate, generation of metal powder by wear due to sliding contact between the outer circumferential surface of end portion of a bushing and the inner circumferential surface of a bushing supporting bore is avoided, and metal powder does not invade the space between the connecting pin and the bushing to cause abrasion, abnormal wear, and undesirable wear elongation of the chain.

As in the first embodiment, since the relationship Dj<Db is satisfied, even if an inner link 240 becomes skewed, pivoted or biased with respect to an outer link 270, an end surface 233 (FIG. 8) of the bushing and a bottom surface 252b (FIG. 8) of a bushing supporting bore 252 come into contact with each other. The end of the bushing and the bottom of the bore 252 have relatively small sliding areas compared to the areas of the mutually facing surfaces of the inner and outer plates. Because the ends of the bushings come into contact with the bottoms of the bores 252 before the inner and outer plates can come together, sliding contact between the mutually facing surfaces of the inner and outer plates is prevented. Thus, smooth bending of the chain over a long period of time can be realized.

In the second embodiment, as in the first embodiment, the relationship $Dj+Do<Di+2Db<2Dj+Do$ is also satisfied. As a result, even if an inner link 240 becomes skewed, pivoted or biased in a widthwise direction with respect to an outer link 270, the protruding end of the bushing 230 cannot separate from the bushing supporting bore 252. Therefore, leakage of lubricating oil and invasion of external dust can be more reliably prevented during operation of the chain, and wear between the outer circumferential surface 261 of the connecting pin 260 and the inner circumferential surface 231 of the bushing 230 can be reduced over a long period of time so that wear elongation of the chain can be prevented.

What is claimed is:

1. An oil-free chain, elongated along a direction of elongation, comprising:

pairs of inner plates and pairs of outer plates in alternating, overlapping relationship along the length of the chain, the inner plates of each pair being directly opposed to each other in a direction perpendicular to the direction of elongation of the chain, and the outer plates of each pair also being directly opposed to each other in a direction perpendicular to the direction of elongation of the chain, each of the inner plates having an inner surface and an outer surface, and each of the outer plates having an inner surface and an outer surface, a portion of the outer surface of each inner plate being in overlapping relationship with a portion of the inner surface of an outer plate;

a pair of bushings for each said pair of inner plates, the bushings having inner circumferential surfaces and end portions, and being press-fit into bushing holes in the inner plates;

a pair of connecting pins for each said pair of outer plates, each pin having an outer circumferential surface and being press-fit into pin holes in the outer plates and extending through, and fitting loosely in, one of said bushings; and lubricating oil sealed between the inner circumferential surface of each bushing and the outer circumferential surface of the connecting pin extending therethrough;

wherein each end portion of each bushing protrudes from the outer surface of the inner plate in which it is press-fit, and extends into a bushing-supporting bore formed in the inner surface of the overlapping outer plate;

wherein each said bushing-supporting bore formed in the inner surface of an outer plate is coaxial with one of said pin holes, and said one of said pin holes extends through an outwardly bulging boss formed on the outer surface of the same outer plate opposite said bushing-supporting bore, each said outwardly bulging boss having a portion surrounding the pin hole therein;

wherein the thickness of each said outer plate, including the thickness of the portion of each said outwardly bulging boss thereof surrounding the pin hole therein is substantially uniform; and wherein the depth Dj of each bushing supporting bore and the extent Db by which each bushing protrudes from the outer surface of the inner plates in which it is press-fit satisfy the relationship $Dj<Db$, and the depth Dj of each bushing supporting bore, the extent Db by which each bushing protrudes from the outer surface of the inner plates in which it is press-fit, the distance Do between inner surfaces of the outer plates of each pair of outer plates, and the distance Di between the outer surfaces of the inner plates of each pair of inner plates satisfy the relationship $Dj+Do<Di+2Db<2Dj+Do$.

2. An oil-free chain according to claim 1, having an oil retaining groove formed on the outer circumferential surface of each connecting pin.

3. An oil-free chain according to claim 1, further comprising a labyrinth structure formed by closely facing rough surfaces formed on overlapping portions of the outer surfaces of the inner plates and the inner surfaces of the outer plates.

4. An oil-free chain according to claim 1, in which the inner diameter Wj of each said bushing supporting bore, the diameter Wbi of the inner circumferential surface of each bushing, the outer diameter Wbo of each bushing, and the outer diameter Wp of each connecting pin satisfy the relationship $Wj-Wbo>Wbi-Wp$.

* * * * *